May 27, 1969 D. S. DIEHL ET AL 3,446,912

TERMINAL FOR ELECTRICAL COMPONENT

Filed Aug. 16, 1967

INVENTORS
DONALD S. DIEHL
ROBERT WAGNER
BY [signature]
ATTORNEY

United States Patent Office 3,446,912
Patented May 27, 1969

3,446,912
TERMINAL FOR ELECTRICAL COMPONENT

Donald S. Diehl, Southampton, Pa., and Robert Wagner, Willingboro, N.J., assignor to TRW Inc., a corporation of Ohio Filed Aug. 16, 1967, Ser. No. 661,094
Int. Cl. H02g *15/08*
U.S. Cl. 174—94 4 Claims

ABSTRACT OF THE DISCLOSURE

A terminal for a disk type electrical component which can be soldered to the component without causing any excess flow of the solder during the soldering operation which could adversely affect the electrical characteristics of the component. The terminal comprises a metal stem having a thin, flat, circular head on one end, and a cylindrical projection extending from the bottom surface of the head. The projection is smaller than the head and is of a thickness no greater than the thickness of the head. The terminal is secured to an electrical component by a layer of solder extending between the head and a metal film on the component.

*Background*

Many types of electrical components, such as semiconductor diodes, capacitors, resistors, etc., comprise a small, flat disk of an electrically suitable material having a metal film coated on one or both flat surfaces. The component is often terminated by a metal stud or wire having a flat head on the end thereof which is soldered to the metal film on the component. When soldering the head of the terminal to the metal film, it is necessary to apply some pressure to insure complete wetting of the head and the metal film by the solder and provide a good bond therebetween. It has been found that during this soldering operation there is a tendency for the solder to flow over the peripheral edge of the component. Such a flow of the solder can either change the electrical characteristics of the component or can even short out the component completely.

*Summary*

It is an object of the present invention to provide a novel terminal for an electrical component.

It is another object of the present invention to provide a novel headed terminal for electrical components.

It is a further object of the present invention to provide a headed terminal which can be soldered to an electrical component without causing any excess flow of the solder during the soldering operation.

It is a still further object of the present invention to provide a headed terminal having a cylindrical projection in the center of the end surface of the head which can be soldered to an electrical component without causing any excess flow of the solder during the soldering operation.

Other objects will appear hereinafter.

*Brief description of drawings*

For the purpose of illustrating the invention, there is shown in the drawings a form which is presently preferred; it being understood, however, that this invention is not limited to the precise arrangements and instrumentalities shown.

*Description of invention*

Figure 2:
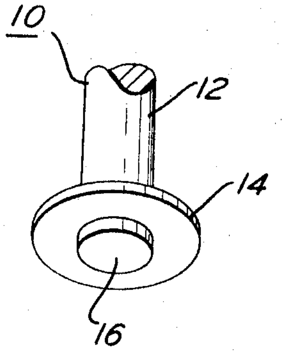
FIGURE 2 is a perspective view of the terminal of the present invention.

Referring initially to FIGURE 2, the terminal of the present invention is generally designated as 10. Terminal 10 comprises a metal stem 12 which may be a stud, wire or the like, and a thin, flat head 14 secured to one end of the stem. The head 14 is shown to be circular but may be polygonal as well. The stem 12 is secured to one of the flat surfaces of the head 14. The head 14 may be formed as an integral part of the stem 12 or may be made separate and secured to the stem such as by welding or brazing. A projection 16 extends from the center of the other flat surface of the head 14. The projection 16 is smaller than the head 14 and of a thickness no greater than the thickness of the head. The projection 16 is shown to be circular but can be polygonal.

Figure 1:
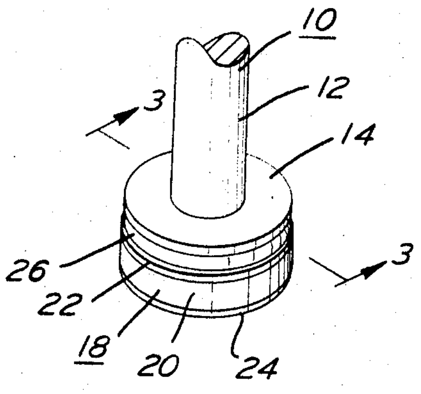
FIGURE 1 is a perspective view of an electrical component having the terminal of the present invention secured thereto.
Figure 3:
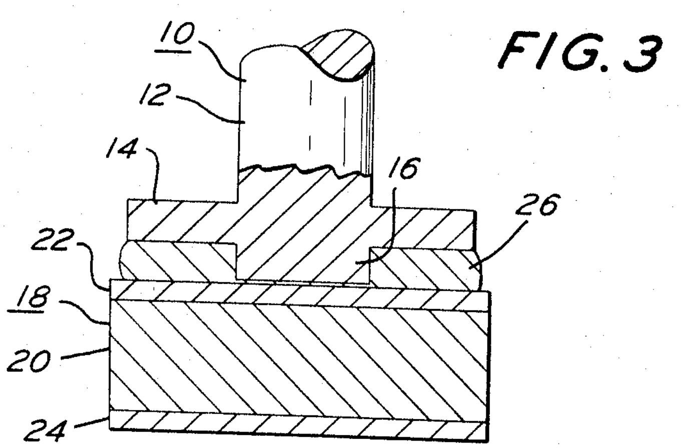
FIGURE 3 is a sectional view taken along line 3—3 of FIGURE 1.

Referring to FIGURES 1 and 3, there is shown the terminal 10 of the present invention secured to an electrical component 18. The electrical component 18 comprises a flat disk 20 of a material having the suitable electrical characteristics for the particular type of component. The disk 20 may be circular or polygonal. For example, if the electrical component 18 is a semiconductor diode, the disk 20 may be of a semiconductor material, such as silicon or germanium, having a p-n junction formed therein as is well known in the art. If the electrical component is a capaictor, the disk 20 is of a material having a high dielectric constant, such as a glass, ceramic, or a metal titanate. If the electrical component 18 is a resistor, the disk 20 is of any well-known resistance material such as a carbon or metal particles embedded in a non-conduction binder, or certain metal oxides, etc. A film of an electrically conductive metal, such as copper, gold, silver, etc., is coated on one surface of the disk 20, and a similar metal film 24 is coated on the other surface of the disk. For a semiconductor diode or a resistor, the metal films 22 and 24 are the electrodes or terminations for the component. In a capacitor, the metal films 22 and 24 are the plates.

The terminal 10 is mounted on the electrical component 18 with the end surface of the projection 16 being seated on the metal film 20 and is secured to the metal film by a layer 26 of solder which extends completely across the head 14. Although the projection 16 is seated on the metal film 20, a thin film of the solder 26 extends between the projection and the metal film. A similar terminal 10 may be soldered to the metal film 24 or the component 18 may be soldered to a housing or other type of mounting.

During the soldering of the terminal 10 to the component 18, the projection 16 limits the movement of the head 14 toward the metal film 20 so that there is less tendency for the solder to be mechanically forced out from under the head 14. Also, the projection 16 provides the head with a larger surface area so as to achieve better wetting of the head for a good bond between the terminal and the solder. In addition, as can be seen in FIGURE 3, the projection 16 provides a thick layer of the solder 26 at the periphery of the head 14. This thick layer has a greater surface tension at the edge of the solder layer so that there is less tendency for the solder to flow out from under the head 14. The thicker layer of solder also allows better removal during the soldering operation of any gases or oxides which may be trapped in the solder so as to achieve a bond which is stronger, fatigue free, and has better electrical conductivity because of the absence of gas bubbles and insulating oxides. Thus, the projection 16 on the head 14 provides for improved wettability and less tendency for the solder to flow out from under the head so as to achieve a better bond between the terminal 10 and the electrical component 18 with less tendency to causing any electrical damage to the component.

We claim:

1. In an electrical component of the type comprising a flat disk having a film of metal on one of the flat surfaces thereof, a terminal of an electrically conductive metal secured to said metal film, said terminal comprising a stem, a flat head on one end of the stem and a projection extending from the end surface of said head on the surface thereof opposite said stem, said projection being smaller than said head, said terminal being secured to said metal film by a layer of solder which extends between and engage said head and the metal film.

2. An electrical component in accordance with claim 1 in which the projection is of a thickness no greater than the thickness of the head.

3. An electrical component in accordance with claim 2 in which the projection substantially engages the metal film with only a thin film of the solder extending between the projection and the metal film and the solder extends to the edge of the head and fills the space between the head and the metal film.

4. An electrical component in accordance with claim 3 in which the head is of a size substantially equal to the size of the disk.

References Cited

UNITED STATES PATENTS

| | | | |
|---|---|---|---|
| 2,989,578 | 6/1961 | Wagner et al. | 174—84 |
| 3,238,425 | 3/1966 | Geyer | 174—52.5 XR |
| 3,339,127 | 8/1967 | Darter et al. | 174—52.5 XR |

DARREL L. CLAY, *Primary Examiner.*

U.S. Cl. X.R.

29—590, 630; 317—234, 261; 338—329